CORNELIA HITCHCOCK.

Coffee-Urns.

No. 5,876. Reissued May 19, 1874.

Witnesses.
Edw. W. Down
L L Gardner Jr.

Inventor.
Cornelia Hitchcock
per William J. Clark
Attorney.

A.M. PHOTO-LITHOGRAPHIC Co. N.Y. (OSBORNE'S PROCESS.)

UNITED STATES PATENT OFFICE.

CORNELIA HITCHCOCK, OF MILLDALE, CONNECTICUT, ASSIGNOR TO HERSELF AND WILLIAM J. CLARK, OF SAME PLACE.

IMPROVEMENT IN COFFEE-URNS.

Specification forming part of Letters Patent No. 145,653, dated December 16, 1873; reissue No. 5,876, dated May 19, 1874; application filed April 24, 1874.

*To all whom it may concern:*

Be it known that I, CORNELIA HITCHCOCK, of Milldale, in the county of Hartford and State of Connecticut, have invented a new and useful Improvement in Tea and Coffee Urns; and I do hereby declare the following, when taken in connection with the accompanying drawings and the letters of reference marked thereon, to be a full, clear, and exact description of the same, and which said drawings constitute part of this specification, and represent, in—

Figure 1:
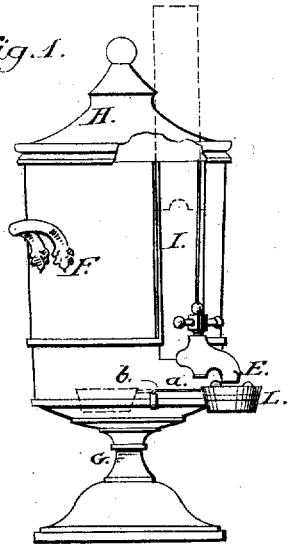
Figure 2:
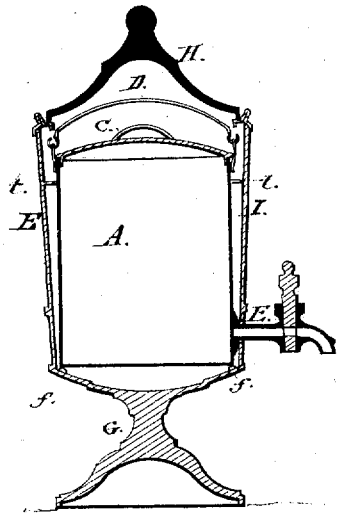
Figure 3:
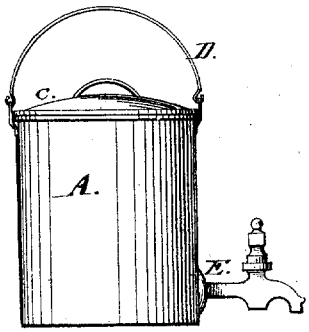

Figure 1, a perspective view, a portion of the corner broken away to illustrate the invention; Fig. 2, a vertical central section through the faucet; and in Fig. 3, the boiler detached.

This invention relates to an improvement in tea and coffee urns, the object being such a construction that the vessel or boiler in which the tea or coffee is to be made may be readily detachable from the urn at pleasure; and the invention consists in a vessel or boiler made from any hard metal suitable for being placed upon a heated stove.

This vessel or boiler is provided with a drawing-faucet below the center line of its containing-space, and combined with a case, within which the said boiler may be set and inclosed, with the faucet projecting at one side of the said case; and, while the said case incloses the boiler as to its upper portions, it also forms a rest or pedestal to support the same. Provision is also made in the construction of the case with reference to the faucet and boiler being constructed for easily and quickly inserting the boiler within the case, or removing it therefrom, whether it contains liquid or not.

A is the boiler, which is made of tin or similar metal, provided with its cover C, bail D, and faucet E. F is a case of any desirable form, resting upon a base, G, the diameter of the case being greater than that of the boiler A, and the height also greater, so that when the boiler A is placed within the case F a cover, H, may be placed over all and inclose the boiler, leaving a space or chamber over and entirely around the same. In this arrangement, in order that the boiler A, with its faucet E, may be inserted to its proper position in the case F, I construct a vertical slide, I, in the side of the case F, where the faucet is to be located, which slide opens down to the point where the faucet will rest. This slide is opened when the boiler is to be introduced, and then closed above the faucet, and the cover placed over all. To remove the boiler, the cover, with the space above the faucet, must be opened. Then, by means of the bail D, the boiler may be removed.

The space above the faucet may be a vertical slide or a hinged portion to open, and the hinged portion may open of sufficient size to permit the introduction of the boiler itself within the case by that means; or the case may be otherwise constructed, it only being essential that it shall be so constructed as to be capable of opening for the introduction to its proper position in the case of the boiler and faucet, and the removal of the same therefrom.

By this construction, the boiler in which the tea or coffee is first made may be introduced into the case or table-urn without loss of the aroma of its contents consequent upon the custom of decocting in one vessel, and then pouring into another to serve therefrom.

This convenience is not attainable in the usual construction of urns; and, further, the case, forming a chamber around the boiler, prevents the contact of the outer air, and hence the heat is retained very much longer upon the contents of the boiler than when it is fully exposed.

To support the boiler within the case, the boiler rests upon a number of bearing-points or studs, as denoted at *f* in Fig. 2. This construction tends to retard the communicating of heat from the boiler and its contents to the case. A flange or studs are located at the upper section of the chamber, upon the boiler or case, as denoted at *t* in Fig. 2, to aid in locating and holding the case and boiler each in proper position relatively when placed together.

To catch the drip from the faucet, I arrange a cup, L, suspended by an arm, *a*, which is attached to the case by a swing-joint, as denoted at *b* in Fig. 1, so that it may be turned to one side from the faucet, as denoted by the broken lines beneath *b* in Fig. 1, when drawing from the urn, and, after drawing, turned beneath the faucet, as seen in the same figure.

I claim as my invention—

1. The combination of a detachable boiler, provided with a faucet below its central section, with a case constructed to inclose the upper portion of and support the boiler, substantially as specified.

2. In combination with a boiler provided with a faucet, a case constructed to open for the reception or removal of the boiler with its faucet, and means for closing the said opening when the boiler is in proper position, substantially as described.

3. In combination with an urn having a faucet leading therefrom, a drip-cup hung to the urn so as to be turned to and from the faucet, substantially as set forth.

CORNELIA HITCHCOCK.

Witnesses:

SARAH J. CLARK,

WM. D. WHITING.